June 21, 1927.
W. D. INSKEEP ET AL
1,632,839
AUTOMATIC RELEASING CLUTCH
Filed Nov. 19, 1925    2 Sheets-Sheet 1
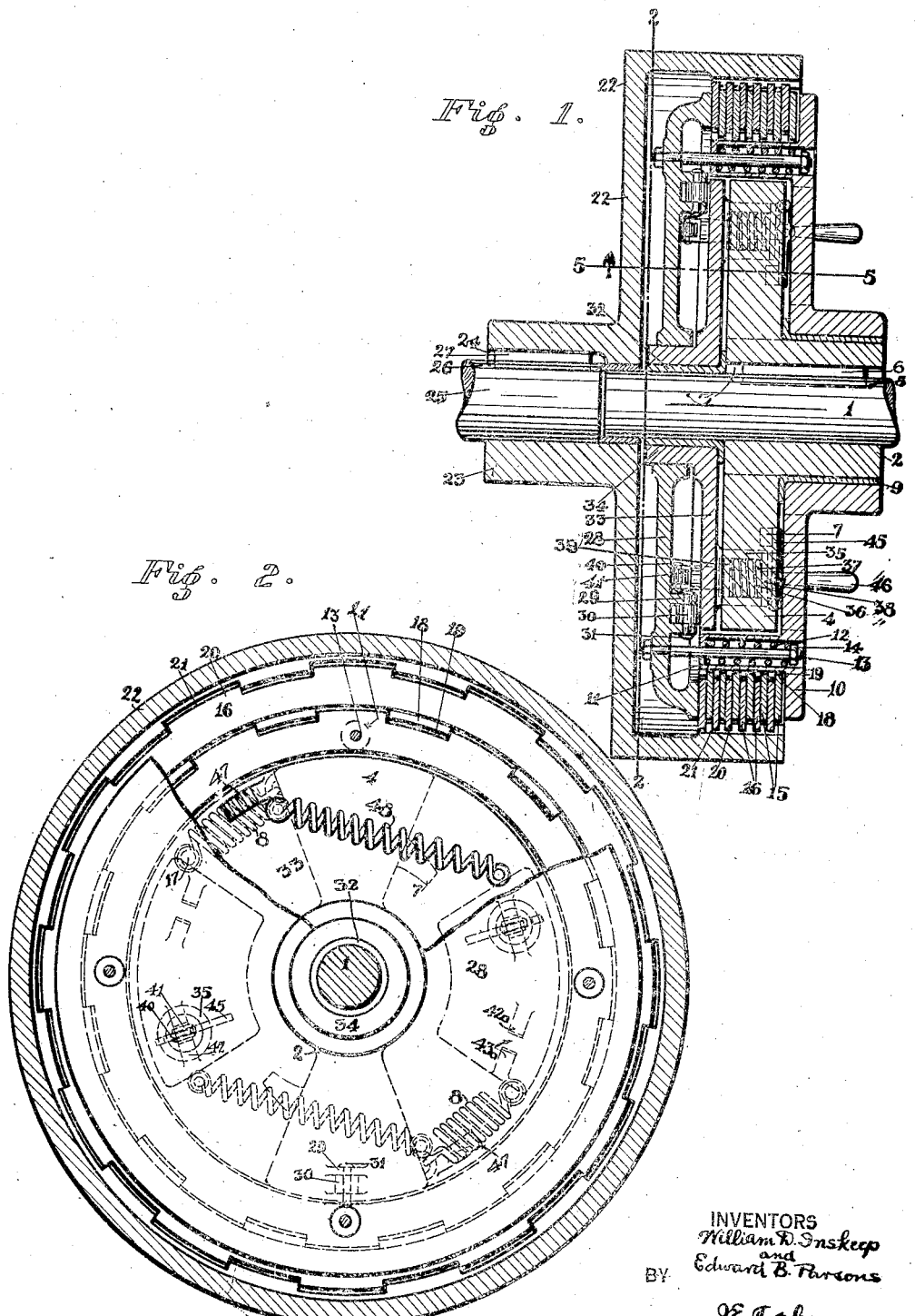
INVENTORS
William D. Inskeep
and
Edward B. Parsons
BY
J. E. Trabucco
ATTORNEY June 21, 1927.
W. D. INSKEEP ET AL
1,632,839
AUTOMATIC RELEASING CLUTCH
Filed Nov. 19, 1925 2 Sheets-Sheet 2
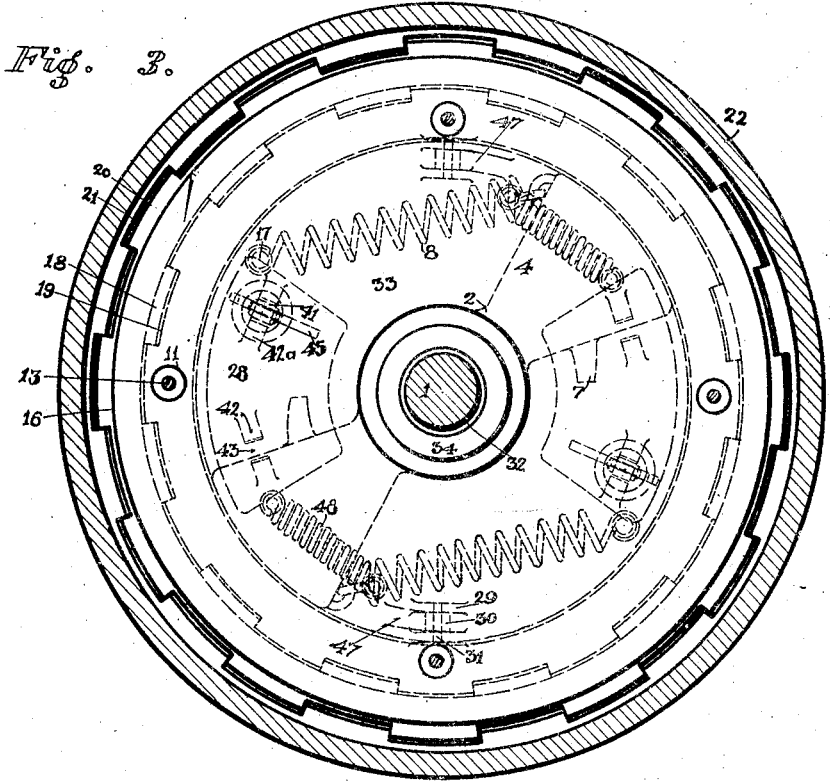
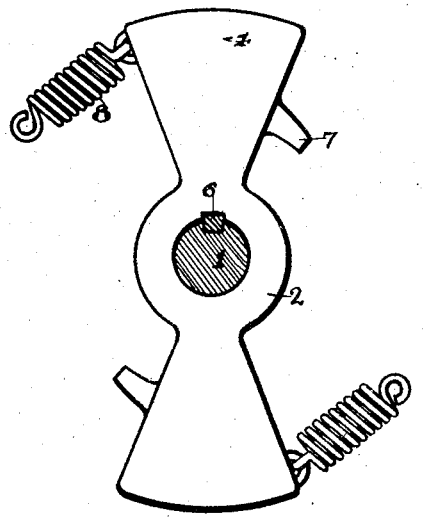
INVENTORS
William D. Inskeep
and
Edward B. Parsons
BY
J. E. Frabucco
ATTORNEY Patented June 21, 1927.

1,632,839

UNITED STATES PATENT OFFICE.

WILLIAM D. INSKEEP AND EDWARD B. PARSONS, OF SAN FRANCISCO, CALIFORNIA.

AUTOMATIC RELEASING CLUTCH.

Application filed November 19, 1925. Serial No. 70,088.

This invention pertains to automatic releasing clutches of the type placed between a driving shaft and a driven shaft whereby a load over a predetermined amount is released from the driving shaft automatically.

An object of this invention is to provide an automatically operated releasing clutch which can be readily applied to a driving shaft.

Another object of this invention is to provide an automatic releasing clutch of the type applied to and connecting a driving shaft and a driven shaft, whereby a load over a given amount may be automatically released from the driving shaft.

A further object of this invention is to provide an automatically operated clutching mechanism attachable to a driving shaft and adapted to relieve a strain from the driving shaft and prevent the same from becoming distorted or broken.

A further object of this invention is to provide an automatically operated releasing clutch for driving shafts, whereby a sudden load or shock is taken up within the clutch and prevented from being transferred to the driving shaft.

In the accompanying drawings:

Fig. 1 represents a vertical cross sectional view of our automatic releasing clutch, showing in detail the relative arrangement of parts when the same is in an operative position;

Fig. 2 is an end view corresponding to Fig. 1, showing the clutch as viewed through line 2—2 of Fig. 1 with certain portions broken away;

Fig. 3 is an end view of the clutch showing the relative position of the various parts when the same is in an inoperative position;

Fig. 4 is an elevation view of a part of the clutch mechanism, showing the manner in which the same is constructed, and Fig. 5 is a sectional view of the clutch mechanism taken on the line 5—5 of Fig. 1.

Referring to the drawings, the numeral 1 represents a driving shaft, connected in the usual manner to a source of power. Extending removably around the shaft 1 is a spider member 2 having slot 3 located on its inside surface and provided with a pair of webbed portions 4. The driving shaft 1 is provided with a slot 5 located in a position opposite to slot 3, and a key 6 extends into slots 3 and 5 to cause member 2 to rotate with shaft 1. The webbed portions 4 are provided with wedge projections 7, and springs 8 are attached to the portions 4 at the edges thereof opposite to the wedge projections 7. Extending around the hub part of member 2 is a bearing plate 9 over which is revolvably mounted a side pressure plate 10, having inwardly projecting members 11 which are provided with recesses suitable in size to accommodate spiral springs 12, located inside the projecting members 11. Extending inside the springs 12 are bolts 13, having nuts 14 secured to their ends. One end of each of the spiral springs 12 bears against the nut 14 and the other end bears against the inside end of projecting member 11, thereby exerting an outward force on the said nut 14.

Located inside the pressure plate 10 are a number of circular discs 15 between which are located an equal number of similar circular discs 16. One of the discs 15 contacts with the inside surface of pressure plate 10, and all of the said discs 15 and 16 contact with each other, thereby causing rotary motion to be transferred from the pressure member 10 to the innermost disc 16, when the said member revolves.

One end of each of the springs 8 is attached to the webbed portions 4 of member 2 and the other end of each of said springs is attached to pressure plate 10 through pins 17, thereby causing, through the connection of the springs 8, a transfer of rotary motion from member 2 to pressure plate 10.

The discs 15 are provided with projections 18 located on their inside circumferential edges, and the said projections are adapted to mesh with slots 19 located on the outside circumferential surface of projecting members 11 of pressure plate 10, thereby causing rotary motion to be delivered to discs 15 from pressure plate 10. Discs 15 in turn transmit motion to discs 16 because of their contact with the said discs 16.

The discs 16 are provided with projections 20 which are adapted to mesh with slots 21 located on the inside circumferential surface of a driven end member 22, the said member 22 being formed so that it extends around the parts of the clutch device and encloses the working parts thereof.

The driven member 22 is provided with a hub 23 inside of which is provided a slot 24 and through which extends a driven shaft 25 having a slot 26 therein, located opposite slot 24. Positioned inside the slots 24 and 26 is a key 27 which secures the said shaft 25 to the driven member 22 and causes them to rotate together as a single unit.

Thus through projections 20 of discs 16 meshing with the slots 21 of driven member 22, and through the connections of discs 16 with the shaft 1, driving power is delivered to the driven shaft 25.

Separated from but attached by bolts 13 and nuts 14 to pressure plate 10 is a disc member 28. The bolts 13 extend through the disc member 28 and the nuts 14 are attached to the ends of the bolts to maintain them in their proper positions. The springs 12 located around the bolts 13 serve to pull the disc member toward the pressure plate 10. The inside surface of the disc member 28 contacts with one of the discs 16, and the pressure of the springs 12 in pulling the member 28 toward plate 10 causes the contact of the member 28 to be quite firm.

Located on the inside surface of the disc member 28 at points toward the center of the said member from the location of bolts 13, are projections 29, inside of which are revolvably attached rollers 30 by means of pins 31 which extend through the projections 29.

Extending around the shaft 1 between the inside edge of spider member 2 and the inside surface of driven member 22 is a bearing plate 32, over which is revolvably placed idling plate 33, having hub 34 thereon. The disc member 28 is rotatably mounted on the hub 34 of idling plate 33. Thus the idling plate 33 is allowed to rotate around shaft 1.

The idling plate 33 is provided on its inside surface with inwardly projecting extensions 35 each having a suitable recess therein for the accommodation of a pin 36, around each of which pins extends a spiral spring 37. One end of each of the spiral springs bears against the enclosed end 38 of one of the extensions 35 and the other end bears against the part 39 which is rigidly secured to the said pin. The pins 36 project through the idling plate 33, and to each of their ends is movably attached by a pin 40, a roller 41. The member 28 adjacent the rollers 41, is provided with wedge shaped projections 42, between each pair of which projections is located a slot 43, in which the said rollers 41 may rest. Secured to each of the pins 36 by means of pins 44 just beyond the enclosed end 38, is a jack 45 under which the wedge projections 7 of member 2 may, as hereinafter described, extend. A lever handle 46 is secured to the end of each of the pins 36 at a point beyond the jacks 45, and the same permits the manual withdrawal of the roller 41 from the slot 43. Located on the member 28, at points the same distance from its center as slots 43, are projections 42ᵃ between which are slots 43ᵃ, adapted to contain rollers 41.

Attached to the idling plate 33 are wedge shaped projections 47, over which rollers 30 may move to separate plate 33 and pressure plate 10, thereby releasing the pressure on discs 15 and 16.

Attached to idling plate 33 and disc member 28 by suitable pins are spiral springs 48, which serve to pull plate 33 so that wedge shaped projections 47 are brought under rollers 30 when rollers 41 are released or withdrawn from slots 43.

As shown in Figs. 1 and 2 the device is in a normal operating position, with the shaft 1 transmitting power to shaft 25 through the clutch mechanism heretofore described. As shown in the said figures, the shaft 1, being secured to member 2 by key 6, causes a rotating motion to be transferred to pressure plate 10, through the connection of the said plate with member 2 by springs 8. Through the contact of discs 15 and 16 with each other and with pressure plate 10, discs 16 with the slots 21 of driven member 22, the said rotary motion of shaft 1 is delivered to the said driven member 22.

In the position of the clutch mechanism as just explained the relative distance between the pressure plate 10 and member 2 may vary through the yieldability of springs 8.

In this position the idling plate 33 rotates directly with disc member 28, since rollers 41 are in an engaged position inside slots 43 of member 28. Springs 48, being connected to disc member 28 and idling plate 33 are under a continuous tension, and in this position, rollers 30 and wedge shaped projections 47 of plate 33 are not in contact with each other. Likewise wedge projections 7 of member 2 are disengaged from jacks 45 that are secured to pins 36.

When a sudden load or shock is placed on driven shaft 25, while the same is transmitting power, the same load or shock is transferred from shaft 25 to driven member 22 through its connection to the said shaft by key 27. The effect of the load, which results in the slowing down of the rotary movement of the driven shaft, is transferred by driven member 22 through the discs 15 and 16 to pressure plate 10 and springs 8. The shaft 1 being secured to member 2 by key 6, and the same, being the driving shaft attached to a source of power, continues to rotate and to transmit power to pressure plate 10 through the springs 8; but the slowing down of the rotary movement of pressure plate 10 by its connection, as explained, to the driven shaft 25, causes it to rotate at a slower velocity than member 2, thereby causing the springs 8 to become extended and the angular displacement between plate 10 and member 2 to be increased to a maximum.

As explained above, since pressure plate 10 is attached to disc member 28 by bolts 13, and idling plate 33 is connected to disc member 28 by rollers 41 being engaged in slots 43 of member 28, the idling plate 33 rotates with the same degree of relative angularity to member 2 as does the pressure plate 10. However, as shown in Fig. 3, when an added load has been given to driven shaft 25, the member 2 continuing to rotate, carries the wedge projections 7 under the jacks 45 and causes the pins 36 to move outwardly, thereby removing the rollers 41 from the slots 43 of member 28. When the rollers 41 are released from slots 43, the plate 33, through its connection to disc member 28 by springs 48, rotates for a distance and to a point where rollers 41 engage in slots 43ª of member 28. When rollers 41 are engaged in slots 43ª of member 28, wedge shaped projections 47 on idling plate 33 become engaged under rollers 30 located on disc member 28, thereby causing member 28 to separate away from pressure plate 10 and thereby releasing the firm pressure of member 28 and plate 10 from the discs 15 and 16. The pressure being taken from the discs 15 and 16, prevents any further power from being delivered to the shaft 25.

To again cause rotary motion to be delivered from shaft 1 to driven shaft 25, power is released from shaft 1 and the lever handles 46 are pulled outwardly thereby lifting the distended rollers 41 from slots 43ª. The distended springs 8, through the manipulation of handles 46, pull the pressure plate 10 and member 2 in a rotary directions towards each other, and rollers 41 again become lodged in slots 43 of disc member 28, while wedge shaped projections 47 of plate 33 are removed from under the rollers 30. Thus the springs 48 connected to idling plate 33 and disc member 28 are again put under tension, and member 28 again puts a pressure on discs 15 and 16, which discs contact firmly with pressure plate 10 and cause the device to become operative.

Although we have described our invention with considerable particularity, it is evident that certain changes may be made in the construction of the various parts and in the form they may assume, so for that reason we do not desire to be limited to the exact construction given herein, but desire the limits of our invention to be included within the spirit of the appended claims.

Having described our invention, what we claim is:

1. An automatic releasing clutch comprising a member attachable to a driving shaft, a plate revolvably mounted on the said member, a plurality of discs having projections thereon contacting with each other and with the said plate, an end member having slots therein adapted to mesh with the projections on some of the discs, a shaft secured to the end member, an idling plate rotatably mounted on the first named shaft, a disc member revolvably mounted on the idling plate and contacting with one of said discs, means securing the idling plate, the disc member and the first mentioned plate together, and means for disconnecting the disc member from the discs, whereby the rotary movement of the second mentioned shaft may be stopped.

2. An automatic releasing clutch comprising a spider shaped member attached to a driving shaft and having a hub thereon, a pressure plate revolvably mounted on the hub of the member, an end member secured to a second shaft having a plurality of grooves on its inside edge, a plurality of discs having projections thereon contacting with each other and with the pressure plate with the projections on some of the discs in mesh with the grooves in the end member, an idling plate revolvably mounted on the driving shaft and having a hub thereon, a disc member rotatably mounted on the hub of the idling plate and contacting with the discs, means connecting the disc member and the pressure plate whereby the disc member is made to firmly contact with the discs, means connecting the idling plate and the disc member, means for removing the disc member from contact with the discs, and means for disconnecting the idling plate from the disc member.

3. An automatic releasing clutch comprising in combination with a driving shaft, a spider shaped member having a hub thereon secured to the driving shaft, a pressure plate revolvably mounted on the hub of the said spider shaped member, an idling plate having a hub thereon revolvably mounted on the shaft adjacent the said spider shaped member, a disc member revolvably mounted on the hub of the idling plate, flexible means connecting the pressure plate and the said spider shaped member, separate means connecting the idling plate, the spider shaped member and the pressure plate whereby they may move as a unit, and means connecting the idling plate and the spider shaped member, whereby the idling plate may be moved by the said spider shaped member for a predetermined distance.

4. An automatic releasing clutch comprising in combination with a driving shaft, a member provided with a hub secured to the shaft, a pressure plate revolvably mounted on the hub of the said member and provided with a plurality of grooved extensions thereon, an end member secured to a second shaft and provided with slots located on its inside circumferential surface, a plurality of discs contacting with each other, and projecting inside the grooves of the said extensions and the slots of the end member and adapted to contact with the inside surface of the pressure plate, an idling plate provided with a hub revolvably mounted on the driving shaft, a disc member revolvably mounted on the hub of the idling plate and adapted to contact with the discs, means connecting the pressure plate, the first mentioned member, the idling plate and the disc member, whereby they may revolve as a unit, and means for disengaging the disc member from contact with the discs, whereby the driving shaft may revolve independently of the second mentioned shaft.

5. An automatic releasing clutch comprising in combination with a driving shaft, a member having a hub secured to the driving shaft, a pressure plate revolvably mounted on the hub of the said member and provided with a plurality of grooved extensions thereon, an end member secured to a second shaft and provided with slots located on its inside circumferential surface, a plurality of discs contacting with each other and projecting inside the grooves of the extensions and the slots of the end member and adapted to contact with the inside surface of the pressure plate, an idling plate provided with a hub revolvably mounted on the driving shaft, a disc member revolvably mounted on the hub of the idling plate and adapted to contact with the discs, removable means connecting the idling plate and the disc member, means connecting the pressure plate, the first mentioned member, the idling plate and the disc member, whereby they may rotate as a unit, a plurality of springs connecting the first mentioned member and the pressure plate, means for disengaging the disc member from contact with the discs and for preventing the disc member from revolving with the idling plate and the first mentioned member, whereby the driving shaft may rotate independently of the second mentioned shaft.

6. An automatic releasing clutch comprising in combination with a driving shaft, a member provided with a hub secured to the driving shaft, a pressure plate revolvably mounted on the hub of the said member and provided with a plurality of inwardly projecting grooved extensions, an end member provided with a plurality of slots located on its inside circumferential surface, a plurality of discs contacting with each other with one of said discs contacting with the pressure plate, the said discs being provided with projections thereon some of which projections are adapted to mesh with the slots in the end member and others with the grooves in the extensions, an idling plate provided with a hub revolvably mounted on the driving shaft, a disc member revolvably mounted on the hub of the idling plate and adapted to contact with the discs, means connecting the pressure plate, the first mentioned member, the idling plate and the disc member whereby they may rotate as a unit, means for disengaging the disc member from contact with the discs and for preventing the disc member from revolving with the idling plate and the first mentioned member, whereby the driving shaft may rotate independently of the second mentioned shaft, and means for bringing the pressure plate, the first mentioned member, the idling plate, the disc member and the end member into position whereby the second mentioned shaft may again rotate with the driving shaft.

7. An automatic releasing clutch comprising in combination with a driving shaft, a member provided with a hub secured to the driving shaft, a pressure plate revolvably mounted on the hub of the member, a plurality of discs contacting with each other with one of them contacting with the pressure plate, an end member secured to a second shaft and some of the discs, an idling plate having a hub thereon revolvably mounted on the driving shaft, a disc member movably mounted on the hub of the idling plate and adapted to contact with the discs, means connecting the pressure plate and the disc member, removable means connecting the pressure plate, the first mentioned member, the idling plate and the disc member whereby they may move as a unit, and means for disengaging the disc member from contact with the discs and for separating the disc member from the idling plate, whereby the driving shaft may rotate independently of the second mentioned shaft.

8. An automatic releasing clutch comprising a driving shaft having a member secured thereto, a pressure plate revolvably mounted on the said member, an idling plate revolvably mounted on the driving shaft, a disc member revolvably mounted on the idling plate, means connecting the disc member and the pressure plate, a plurality of discs located between the pressure plate and the disc member with one of the discs adapted to contact with the disc member and another of the discs contacting with the pressure plate and some of the discs secured to the pressure plate, a second shaft having an end member secured thereto and also secured to some of the discs, means connecting the pressure plate, the first mentioned member, the idling plate and the disc member, whereby they may rotate as a unit, and means for disconnecting the disc member from contact with the discs, whereby the driving shaft may rotate independently of the second named shaft.

9. An automatic releasing clutch comprising a driving shaft having a member secured thereto, a pressure plate revolvably mounted on the said member, an idling plate revolvably mounted on the driving shaft, a disc member revolvably mounted on the idling plate, a second shaft having an end member secured thereto, a plurality of discs adapted to contact with each other located between the pressure plate and the disc member with some of them secured to the end member and others secured to the pressure plate, and means joining the pressure plate and the disc member and means for removing the disc member from contact with the discs, whereby the driving shaft may rotate independently of the second named shaft.

WILLIAM D. INSKEEP.
EDWARD B. PARSONS.